(12) United States Patent
Chinomi et al.

(10) Patent No.: US 7,228,137 B2
(45) Date of Patent: Jun. 5, 2007

(54) MOBILE BODY INFORMATION SYSTEM

(75) Inventors: Satoshi Chinomi, Yokohama (JP); Toru Takagi, Yokohama (JP); Susumu Fujita, Yokohama (JP); Masayasu Suzuki, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 418 days.

(21) Appl. No.: 10/653,955

(22) Filed: Sep. 4, 2003

(65) Prior Publication Data
US 2004/0077362 A1 Apr. 22, 2004

(30) Foreign Application Priority Data
Oct. 16, 2002 (JP) .............................. 2002-302160

(51) Int. Cl.
*H04Q 7/20* (2006.01)
(52) U.S. Cl. ................................ 455/456.1; 455/569.1; 455/575.9; 455/453
(58) Field of Classification Search ............ 455/412.2, 455/440, 446, 453, 456.1, 457, 404.2, 412.1, 455/413, 414.2, 445, 444, 569.1, 575.9; 340/988, 340/425.5; 701/200
See application file for complete search history.

(56) References Cited

U.S. PATENT DOCUMENTS 6,912,385 B2 * 6/2005 Namba et al. .............. 455/419
2001/0034239 A1 * 10/2001 Yamato et al. .............. 455/456
2001/0044315 A1 * 11/2001 Aoki et al. .................. 455/524
2002/0118656 A1 * 8/2002 Agrawal et al. ............ 370/329
2005/0153697 A1 * 7/2005 Patel .......................... 455/442

FOREIGN PATENT DOCUMENTS
JP 2002-123441 A 4/2002

* cited by examiner

*Primary Examiner*—Duc M. Nguyen
*Assistant Examiner*—Dai Phuong
(74) *Attorney, Agent, or Firm*—Global IP Counselors

(57) ABSTRACT

A mobile body information system comprises a center system and a vehicle-mounted terminal device. The vehicle-mounted terminal device is configured to determine a density of communication areas of narrow area wireless base stations along a travel route of a vehicle based on a current position of the vehicle and installation data of the narrow area wireless base stations. When the density of communication areas is high, the vehicle-mounted terminal device is configured to recommend to a user a divided download format in which the information is intermittently distributed through a plurality of the narrow area wireless base stations while the vehicle is travelling. When the density of the communication areas is low, the vehicle-mounted terminal device is configured to recommend a batch download format in which the information is distributed through one of the narrow area wireless base stations while the vehicle remains in one communication area.

20 Claims, 7 Drawing Sheets

MOBILE BODY INFORMATION SYSTEM

BACKGROUND OF THE INVENTION

1. Field of the Invention

The present invention relates to a mobile body information system. In particular, the present invention relates to a mobile body information system that is configured to distribute information or a content, e.g., music, to a mobile body such as a mobile terminal installed in a vehicle.

2. Background Information

Recent years, the information or contents such as music data can be distributed to a home personal computer (PC) through the Internet. Moreover, the information can also be distributed directly to a communication device or a mobile terminal installed in a vehicle using a multi-area format system. In the multi-area format system, a plurality of narrow area wireless base stations at narrow wireless communication facilities cover a plurality of corresponding communication areas and communicate with a communication device of a mobile terminal that is within the corresponding communication areas. Thus, the information is distributed to the mobile terminal on the vehicle when the vehicle enters a specific communication area of a corresponding narrow area wireless base station installed at, for example, a convenience store.

Installing the mobile terminal for this type of mobile body information system on a vehicle is optional. Also, it is required for an existing vehicle to install expensive special devices to receive information in this type of mobile body information system.

To solve this problem, Japanese Laid-Open Patent Publication No. 2002-123441 discloses a method to control communication by utilizing other wireless communication tools than the narrow area wireless communication, such as a portable phone. More specifically, the method disclosed in this publication utilizes a function of the portable phone that allows a user to browse Internet home pages or Web pages to receive distribution of information from the Web pages.

In the above method, both the narrow area wireless base stations at narrow wireless communication facilities and the communication device of the vehicle have fixed addresses or URLs (Uniform Resource Locators). By using the portable telephone, the user accesses a home page of an information distribution center that distributes contents, selects a required content or contents that the user wishes to download, and then registers the URL of the narrow area wireless base station that covers the area where the vehicle is currently located and the URL of the communication device in the vehicle. As a result, the required information is downloaded from the information distribution center to the corresponding narrow area wireless base station. The information is then distributed to the communication device in the vehicle through the corresponding narrow area wireless base station.

In view of the above, it will be apparent to those skilled in the art from this disclosure that there exists a need for an improved mobile body information system. This invention addresses this need in the art as well as other needs, which will become apparent to those skilled in the art from this disclosure.

SUMMARY OF THE INVENTION

In the conventional mobile body information system explained above, the required information is downloaded to the communication device after the vehicle is determined to be within the communication area that is within a fixed distance from the corresponding narrow area wireless base station. The vehicle is required to remain in the communication area while the information is downloaded to the communication device.

Unlike communication areas of portable telephones, the communication areas covered by the narrow wireless base stations do not normally overlap each other. Therefore, in conventional mobile body information systems utilizing the narrow wireless base stations, it is not feasible to receive lengthy distribution of information through communication while a vehicle is traveling, or to handover communication between a plurality of narrow area wireless base stations.

Thus, if a vehicle with the communication device communicating with a narrow area wireless base station leaves the communication area of the narrow area wireless base station, the information distribution will be cutoff in the middle of the distribution. Therefore, the information will not be completely downloaded and the user will not be able to utilize the information afterward. Accordingly, in the conventional mobile body information system, the vehicle must remain within the communication area of the narrow area wireless base station that is communicating with the communication device while the information is being received.

Moreover, there are other inconveniences with the conventional mobile body information system that the user cannot download the desired information as the user wishes in regions where only a few narrow area wireless base stations are installed. Furthermore, it has been a problem that the user has to search for the locations where narrow area wireless base stations are installed in order to acquire information at any time and then the user has to move the vehicle to that particular location.

In order to solve the above-mentioned problems, an object of the present invention is to provide a mobile body information system in which the user can select a communication format for downloading the information. Mores specifically, the mobile body information system of the present invention provides the user options to download the information in a batch download format or a divided download format. In the batch download format, the vehicle remains within a communication area of a specific narrow area wireless base station to receive the information through the specific narrow area wireless base station based on the installation density of narrow area wireless base stations with respect to a current position of mobile terminal. In the divided download format, the information is distributed while the vehicle is traveling through a plurality of the narrow area wireless base stations. Therefore, the user can select the communication format that better suites for the user and makes it easier to reliably receive distributed content in a shorter time.

In order to achieve the above objects, a mobile body information system for use in distributing information by a plurality of wireless base stations covering a plurality of communication areas is provided that comprises a mobile terminal. The mobile terminal is adapted to be mounted on a vehicle for receiving the information and includes a wireless communication section and a communication format determination section. The wireless communication section is configured and arranged to communicate with at least one of the wireless base stations. The communication format determination section is configured and arranged to present a recommended communication format to a user of the mobile terminal based on a density of the communication areas of the wireless base stations along a travel route of the vehicle. The communication format determination section is further configured and arranged to select a divided download format when the density of the communication areas is determined to be high in which the information is distributed to the mobile terminal through at least two of the wireless base stations within corresponding communication areas of the at least two of the wireless base stations while the vehicle is traveling. The communication format determination section being further configured and arranged to select a batch download format when the density of the communication areas is determined to be low in which the information is distributed to the mobile terminal through one of the wireless base stations within a corresponding communication area of the one of the wireless base stations.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
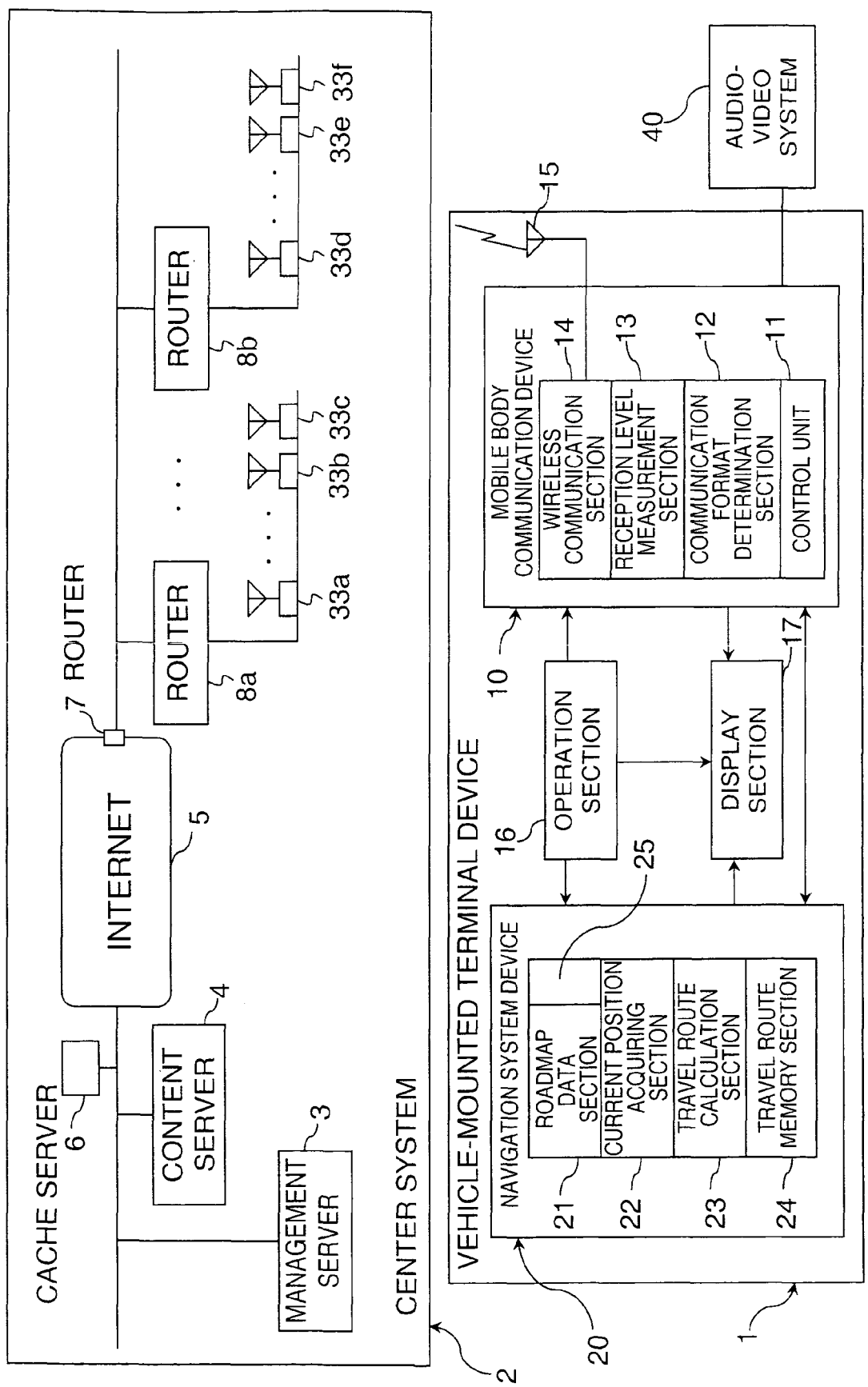
FIG. 1 is a block diagram illustrating system configuration of a mobile body information system in accordance with a first embodiment of the present invention.

Referring initially to FIG. 1, a mobile body information system is illustrated in accordance with a first embodiment of the present invention. FIG. 1 is a block diagram illustrating a system configuration of the mobile body information system in accordance with the first embodiment of the present invention.

As shown in FIG. 1, the mobile body information system basically comprises a vehicle-mounted terminal device 1 and a center system 2. The vehicle-mounted terminal device 1 is a mobile terminal of a user or a receiver of the distribution of information. The center system 2 is configured and arranged to distribute information to the vehicle-mounted terminal device 1. In the mobile body information system in accordance with the first embodiment of the present invention, the user can select a communication format, i.e., a divided download format or a batch download format, in which the information is distributed to the vehicle-mounted terminal device 1. The vehicle-mounted terminal device 1 is preferably configured and arranged to determine a recommended communication format based on installation density of a plurality of narrow are wireless base stations (only wireless base stations 33a-33f are shown) of the center system 2 in a planned travel route of the vehicle-mounted terminal device 1. More specifically, when it is determined that the installation density of the narrow area wireless base stations 33a-33f is low, the vehicle-mounted terminal device 1 is configured and arranged to recommend the batch download format in which the information is downloaded to the vehicle-mounted terminal device 1 within a communication area corresponding to one of the narrow are wireless base stations 33a-33f. When it is determined that the installation density of the narrow area wireless base stations 33a-33f is high, the vehicle-mounted terminal device 1 is configured and arranged to recommend the divided download format in which the information is intermittently downloaded to the vehicle-mounted terminal device 1 within a plurality of communication areas corresponding to a plurality of the narrow area wireless base stations 33a-33f. Therefore, with the mobile body information system of the present invention, a vehicle equipped with the vehicle-mounted terminal device 1 can be directed to locations where the information can be reliably acquired, and thus, the distribution of the information to the vehicle-mounted terminal device 1 can be reliably completed.

The vehicle-mounted terminal device 1 basically comprises a mobile body communication unit 10, a navigation system unit 20, an operation section 16, a display section 17 and an antenna 15. The mobile body communication unit 10 is configured and arranged to perform a communication function. The navigation system unit 20 is configured and arranged to assist the communication function of the mobile body communication unit 10. The operation section 16 and the display section 17 are configured to function as man-machine interface for the navigation system. The antenna 15 is coupled to the mobile body communication unit 10 to direct outgoing and incoming radio waves.

The mobile body communication unit 10 of the vehicle-mounted terminal device 1 further comprises a control unit 11, a communication format determination section 12, a reception level measurement section 13 and a wireless communication section 14. The control unit 11 is configured and arranged to control the entire vehicle-mounted terminal device 1.

More specifically, the control unit 11 preferably includes a microcomputer with a control program that controls the vehicle-mounted terminal device 1 as discussed below. The control unit 11 can also include other conventional components such as an input interface circuit, an output interface circuit, and storage devices such as a ROM (Read Only Memory) device and a RAM (Random Access Memory) device. The microcomputer of the control unit 11 is programmed to control the operation of the vehicle-mounted terminal device 1. The internal RAM of the control unit 11 stores statuses of operational flags and various control data. The control unit 11 is capable of selectively controlling any of the components of the vehicle-mounted terminal device 1 in accordance with the control program. It will be apparent to those skilled in the art from this disclosure that the precise structure and algorithms for control unit 11 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The communication format determination section 12 is configured and arranged to determine a communication format between at least one of the narrow area wireless base stations 33a-33f of the center system 2 as discussed in more detail below. The reception level measurement section 13 is configured and arranged to measure communication sensitivities between the narrow area wireless base stations 33a-33f and the vehicle-mounted terminal device 1. The wireless communication section 14 is configured and arranged to communicate with the at least one of the narrow area wireless base station 33a-33f.

The navigation system unit 20 further comprises a roadmap data section 21, a current position acquiring section 22, a travel route calculation section 23, a travel route memory section 24, and a base station data section 25. The roadmap data section 21 is configured and arranged to read roadmap data, as necessary, that corresponds to longitude and latitude information recorded on a recording medium such as a hard disk, DVD-ROM or CD-ROM. The current position acquiring section 22 is configured and arranged to detect the current position of the vehicle, e.g., longitude and latitude, by using, for example, GPS (Global Positioning System). The travel route calculation section 23 is configured and arranged to calculate a planned travel route from the current position of the vehicle to a destination inputted by the user or through-point locations based on the roadmap data of the roadmap data section 21. The travel route memory section 24 is configured and arranged to store the planned travel route determined by the user based on the travel route calculated by the travel route calculation section 23 as well as the actual travel route. The base station data section 25 is configured and arranged to store locations of the narrow area wireless base stations 33a-33f with respect to the roadmap data, e.g., longitude and latitude, and data related to corresponding communication areas and reception sensitivity levels.

The display section 17 of the vehicle-mounted terminal device 1 is connected to the mobile body communication unit 10 and the navigation system unit 20. The display section 17 is configured and arranged to display navigation system information of the navigation system unit 20 and operation screens of the mobile body communication unit 10. The display screen 17 is further configured and arranged to display the information or contents distributed from the center system 2.

The operation section 16 of the vehicle-mounted terminal device 1 is connected to the mobile body communication unit 10, the display section 17 and the navigation system unit 20. The operation section 16 is configured and arranged to operate both the navigation system unit 20 and the mobile body communication unit 10.

For example, when the operation section 16 is used to operate a navigation function of the navigation system unit 20, the user can switch between an operation screen, a map screen and a route display screen that are selectively displayed on the display screen of the display section 17, as well as enter destinations by operating the operation section 16. Moreover, the user can also execute operations such as switching to the operation screen of the mobile body communication unit 10 or a display screen containing the information or contents distributed from the center system 2.

Accordingly, the operation section 16 is preferably configured and arrange to include components such as a power supply switch, a cursor movement pushbutton switch, a cursor movement trackball or stick, a decision button switch, a "car navigation / mobile body communication" selection switch, and the like.

The mobile body communication unit 10 is preferably coupled to an audio/video system 40 that is configured and arranged to play back the contents such as music or images. Thus, the user can play back the information or contents distributed to the vehicle-mounted terminal device 1 from the center system 2 by using the audio-video system 40.

Next, the center system 2 will be described. The center system 2 basically comprises a management server 3, a content server 4, a cache server 6, a plurality of first routers (only a router 7 is shown), a plurality of second routers (only routers 8a-8b are shown), and the plurality of narrow area wireless base stations (only the wireless base stations 33a-33f are shown). Moreover, as seen in FIG. 1, the center system 2 is operatively coupled to the internet 5. Thus, the Internet 5 forms a part of the center system 2. The management server 3, the content server 4 and the cache server 6 constitute a host that is configured and arranged to store contents to be distributed and control the distribution of the contents. The Internet 5 is used to connect the host, i.e., the management server 3, the content server 4, the cache server 6 and the narrow area wireless base stations 33a-33f. Accordingly, the center system 2 is a mobile body communication system utilizing a multi-area format in which a plurality of communication areas is established by the plurality of wireless base stations 33a-33f. Each composition of the center system 2 will be described in more detail below.

The management server 3, the content server 4 and the cache server 6 are preferably coupled to the Internet 5, as mentioned above. The management server 3 is configured and arranged to have a management function that distributes information to the vehicle-mounted terminal device 1. The content server 4 is configured and arranged to store the information or contents and respond to distribution requests from the management server 3. The cache server 6 is configured and arranged to temporarily store the information or contents that are requested for distribution and sent from the content server 4. The cache server 6 is controlled by the management server 3 and configured and arranged to send the information or contents to the vehicle-mounted terminal device 1 by packet communication. In the packet communication, the content is divided into a plurality of smaller units (packets). Each packet is appended with information such as a destination address or control information. With the packet communication, a plurality of users can share a circuit to reliably receive contents from servers since contents are divided into smaller pieces on which the destination addresses are appended.

The content server 4 is configured and arranged to constantly store local information contents corresponding to each of the narrow area wireless base stations 33a-33f. Local information contents are contents that indicate information in the vicinity of each of the narrow area wireless base stations 33a-33f such as information on restaurants, coffee shops, hotels, banks, hospitals and police stations. The local information contents are preferably managed such that they are periodically updated.

The content server 4 is further configured to store shared information contents that are common to the narrow area wireless base stations 33a-33f such as weather reports and news. The shared information contents are managed such that they are periodically updated.

Moreover, the content server 4 is also configured and arranged to store contents such as music or images provided from content provider companies. Thus, it will be apparent from those skilled in the art from this disclosure that the content server 4 does not have to be a single server. More specifically, the content server 4 can be divided among several servers according to the types of contents that are managed by each content provider company. In such a case, the management server 3 is configured to access any content server that provides or stores a requested content.

The Internet 5 is preferably configured to include a large number of the first routers (only one first router 7 is shown for the sake of brevity). Each first router 7 is configured and arranged to distribute packets of requested information sent from the cache server 6. The addresses appended on the packets are controlled by the management server 3. Each first router 7 is configured and arranged to distribute the packets to appropriate second routers (only the routers 8a and 8b are shown) in accordance with addresses appended to the packets.

The second routers 8a and 8b are terminal or end routers that are coupled to the Internet 5. The second routers 8a and 8b are configured and arranged to appropriately distribute packets of distributed information from the cache server 6 to appropriate narrow area wireless base stations 33a-33f in accordance with addresses appended to the packets.

The narrow area wireless base stations 33a-33f are, for example, routers of wireless LANs (LAN: Local Area Network) or DSRC (DSRC: Dedicated Short Range Communications). Each of the narrow area wireless base stations 33a-33f is configured and arranged to establish communication with the vehicle-mounted terminal device 1 when the vehicle is within a corresponding communication area. The narrow area wireless base stations 33a-33f are configured and arranged to receive a fixed address MR of the vehicle-mounted terminal device 1 from the vehicle-mounted terminal device 1. Moreover, when the vehicle is communicating with one of the narrow area wireless base stations 33a-33f within a corresponding communication area, the one of the narrow area wireless base stations 33a-33f is configured and arranged to assign and append a temporary mobile address MR1 to the fixed address MR of the vehicle-mounted terminal device 1 to maintain communication between the vehicle-mounted terminal device 1 and the management server 3 and/or the cache server 6.

When the vehicle-mounted terminal device 1 receives the packet sent from the management server 3 or the cache server 6 through the one of the wireless base stations 33a-33f, the vehicle-mounted terminal device 1 is configured and arranged to identify the packets using the fixed address MR and the mobile address MR1 appended on the packets. As mentioned above, the mobile address MR1 is an address that is temporarily given to the vehicle-mounted terminal device 1 when the vehicle is within a corresponding communication area of the one of the narrow area wireless base stations 33a-33f.

The control of packet communication is managed by the management server 3. The control of packet communication includes management of mobile address between the vehicle-mounted terminal device 1 and the management server 3, e.g., requesting and assigning mobile addresses, and implementation of content distribution and/or discontinuation or suspension of the distribution if necessary.

In the mobile body information system in accordance with the first embodiment of the present invention, when the vehicle-mounted terminal device 1 determines that there is a high density of the narrow area wireless base stations 33a-33f installed along the planned travel route and the user selects the divided download format, the requested content will be intermittently distributed from two or more the narrow area wireless base stations 33a-33f while the vehicle is traveling. When the vehicle-mounted terminal device 1 determines that there is a low density of the narrow area wireless base stations 33a-33f and when the user selects a batch download format, the vehicle will be guided to within the closest communication area corresponding to one of the narrow area wireless base stations 33a-33f selected by the user. Then, the content will be distributed to the vehicle-mounted terminal device 1 within the communication area.

A method to control communication between the center system 2 and the vehicle-mounted terminal device 1 via the narrow area wireless base stations 33a-33f will now be described in more detail.

When the vehicle-mounted terminal device 1 is turned on and the vehicle enters within a communication area of the narrow area wireless base station 33a, the control unit 11 of the mobile body communication unit 10 of the vehicle-mounted terminal device 1 is configured to transmit its own fixed address MR to the narrow area wireless base station 33a through the wireless communication section 14. Also, the vehicle-mounted terminal device 1 is configured and arranged to request a mobile address be assigned to the vehicle-mounted terminal device 1.

The narrow area wireless base station 33a is configured to connect to the management server 3 via the router 8a and the router 7 connected to the Internet 5. Upon receiving the request from the vehicle-mounted terminal device 1, the management server 3 is configured to establish the information channels and assign a mobile address MR1 to the vehicle-mounted terminal device 1 within the communication area of the narrow area wireless base station 33a. Then, the management server is configured to append the fixed address MR and the mobile address MR1 of the vehicle-mounted terminal device 1 onto packets comprising a list of contents and send the list of contents to the vehicle-mounted terminal device 1 by packet communication. The list of contents is displayed on the display section 17 of the vehicle-mounted terminal device 1 so that the user can select a content or contents that the user wishes to download.

If the management server 3 receives a request for distribution of a content from the vehicle-mounted terminal device 1, the management server 3 is configured to direct the content server 4 to store the requested content in the cache server 6 and indicate the fixed address MR of the vehicle-mounted terminal device 1 as the destination for the packets at this time.

When the batch download format is selected by the user, the management server 3 is configured to receive a location of the narrow area wireless base station 33b where the user wishes to execute the batch download from the vehicle-mounted terminal device 1. Then the management server 3 is configured and arranged to send an address of the narrow area wireless base station 33b to the cache server 6 such that the narrow area wireless base station 33b is set as a communication path between the cache server 6 and the vehicle-mounted terminal device 1.

When that vehicle-mounted terminal device 1 enters into the communication area of the narrow area wireless base station 33*b*, the mobile body communication unit 10 of the vehicle-mounted terminal device 1 requests that the management server 3 assign a mobile address be assigned to the vehicle-mounted terminal device 1. Upon receiving the request from the vehicle-mounted terminal device 1, the management server is configured to assign a mobile address MR2 to the vehicle-mounted terminal device 1 within the communication area of the narrow area wireless base station 33*b*. Then, the management server 3 is configured to instruct the cache server 6 to append the mobile address MR2 on the packets of the content and transmit the content to the vehicle-mounted terminal device 1. Then, the management server 3 is preferably configured to transfer the control of transmission of the content to the vehicle-mounted terminal device 1 to the cache server 6.

The vehicle-mounted terminal device 1 is configured to transmit a transmit start request to the narrow area wireless base station 33*b*. Upon receiving the transmit start request from the vehicle-mounted terminal device 1, the cache server 6 is configured to transmit the packets of the content on which the fixed address MR and the mobile address MR2 are appended to the vehicle-mounted terminal device 1 via the narrow area wireless base station 33*b*.

The vehicle-mounted terminal device 1 is configured to receive the packets of the content from the narrow area wireless base station 33*b*. The vehicle-mounted terminal device 1 is configured to send a verification response to the narrow area wireless base station 33*b* after receiving a packet for verifying that each packet was received without errors. If the prior packet was received by the vehicle-mounted terminal device 1 without errors, then the cache server 6 continue to send subsequent packets until all of the packets are received by the vehicle-mounted terminal device 1.

When the reception of the requested content is completed, the vehicle-mounted terminal device 1 is configured to send a reception complete notification to the management server 3.

Figure 2:
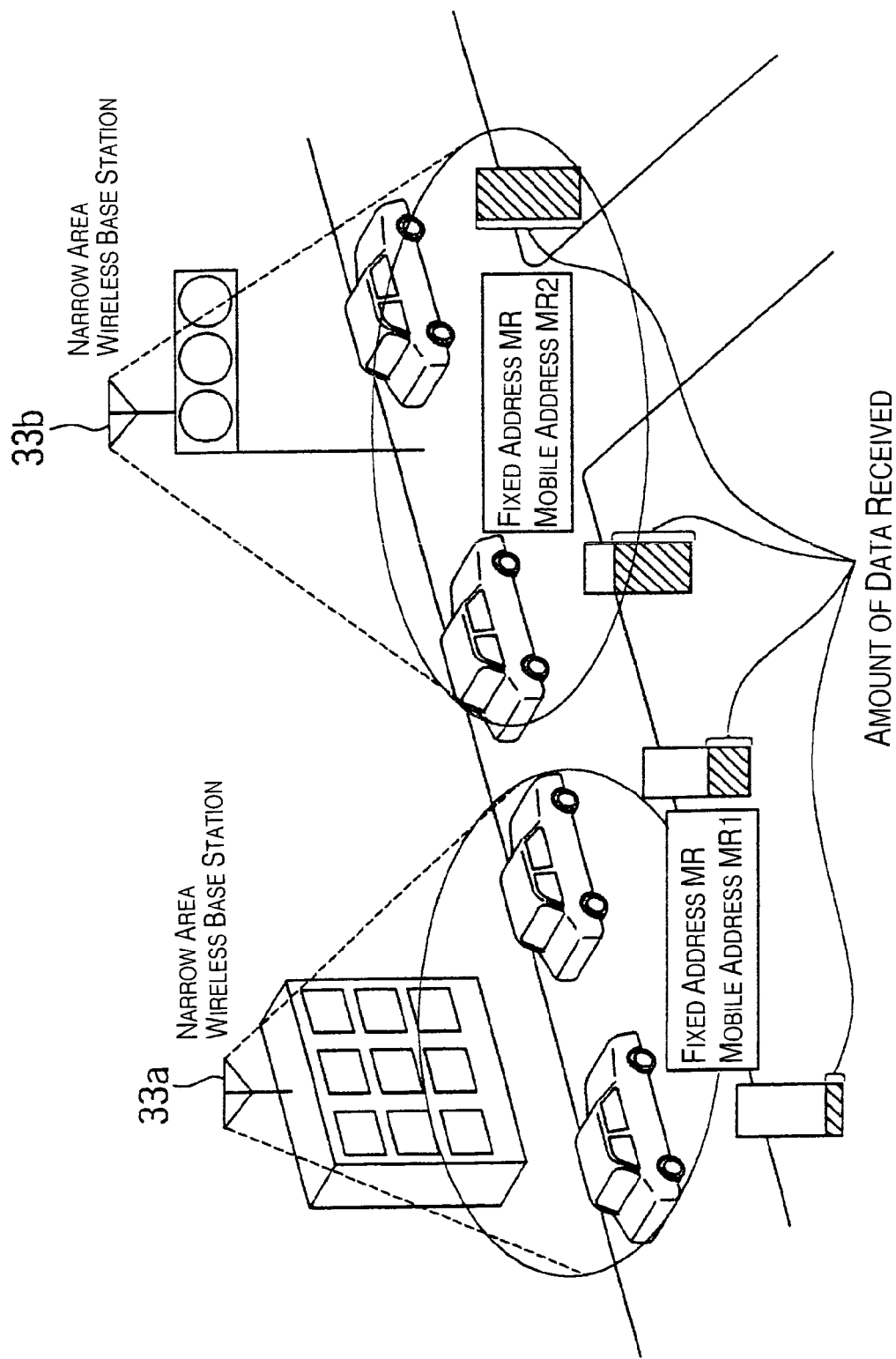
FIG. 2 is a diagrammatic view of a vehicle and narrow area wireless base stations illustrating a divided download format of the mobile body information system in accordance with the first embodiment of the present invention.

Referring now to FIG. 2, communication control when the divided download format is selected by the user will be described using an example of handing over control from the narrow area wireless base station 33*a* to the narrow area wireless base station 33*b*.

When the divided download format is selected when the vehicle is communicating with the narrow area wireless station 33*a* within the communication area of the narrow area wireless base station 33*a*, the management server 3 is configured to send the address of the narrow area wireless base station 33*a* and the mobile address MR1 of the vehicle-mounted terminal device 1 to the cache server 6 as an initial communication path. Then the management server 3 is also configured to direct the transmission of the requested content to the vehicle-mounted terminal device 1 from the cache server 6.

The cache server 6 is configured to receive a transmission start request from the vehicle-mounted terminal device 1 via the management server 3 and then transmit packets of the requested content to the mobile address MR1 of the vehicle-mounted terminal device 1 via the initial communication path of the narrow area wireless base station 33*a*. The vehicle-mounted terminal device 1 is configured to send reception verification signals for each packet to the cache server 6 via the narrow area wireless base station 33*a* as the vehicle-mounted terminal device 1 receives the each packet.

The transmission of the content from the cache server 6 to the vehicle-mounted terminal device 1 is continued as long as a reception level of the signals from the narrow area wireless base station 33*a* to the vehicle-mounted terminal device 1 is sufficient to download the content. More specifically, the reception level measurement section 13 of the vehicle-mounted terminal device 1 is configured to continuously measure the radio wave reception sensitivity from the narrow area wireless base station 33*a*. When the reception level measurement section 13 detects a reception sensitivity lower than a predetermined value before the vehicle leaves the communication area of the narrow area wireless base station 33*a*, the vehicle-mounted terminal device 1 is configured to transmit a transmission stop request to the narrow area wireless base station 33*a* via the wireless communication section 14. The transmission stop request is forwarded to the cache server 6 and the management server 3 such that the transmission of the packets of the requested content is temporarily interrupted.

When the vehicle continues to travel and enters into a communication area of the narrow area wireless base station 33*b*, the vehicle-mounted terminal device 1 is configured to request a mobile address be assigned to the management server 3. The management server 3 is configured to assign a mobile address MR2 to the vehicle-mounted terminal device 1, and issue an order to the cache server 6 to append the mobile address MR2 on the packets of the requested content on which the fixed address MR has been already appended.

The cache server 6 is configured to append the fixed address MR and the mobile address MR2 to the packets of the requested content and then start the transmission of the content via the narrow area wireless base station 33*b*. More specifically, the cache server 6 is configured to transmit the requested content starting from a packet with a sequence number that follows a packet for which a reception verification from the vehicle-mounted terminal device 1 was last obtained.

The vehicle-mounted terminal device 1 is configured to verify, via the narrow area wireless base station 33*b*, the sequence number of the packet that should be received next based on the sequence number of the last incoming packet just before the interruption of the transmission. Then the vehicle-mounted terminal device 1 is configured and arranged to continue downloading the content through the narrow area wireless base station 33*b* while the vehicle is travelling within the communication area of the narrow area wireless base station 33*b*. In other words, the downloading of the requested content continues when the vehicle-mounted terminal device 1 enters the communication area of the narrow area wireless base station 33*b*, and begins the next packet that follows the last packet received without errors in the prior communication area of the narrow area wireless base station 33*a*.

Handing over of the transmission between one of the narrow area wireless base stations 33*a*-33*f* to another of the narrow area wireless base stations 33*a*-33*f* is continues if the transmission is interrupted and resumed until all the packets of the requested content is distributed from the cache server 6 to the vehicle-mounted terminal device 1.

The cache server 6 is configured to notify the management server 3 of a transmission complete for each unit of content that completed transmission.

Moreover, when the reception of the requested content is completed, the vehicle-mounted terminal device 1 is configured to notify the management server 3 of a reception complete.

Referring now to FIGS. 3-6, the operation processing of the mobile body information system in accordance with the first embodiment of the present invention will be described.

Figure 3:
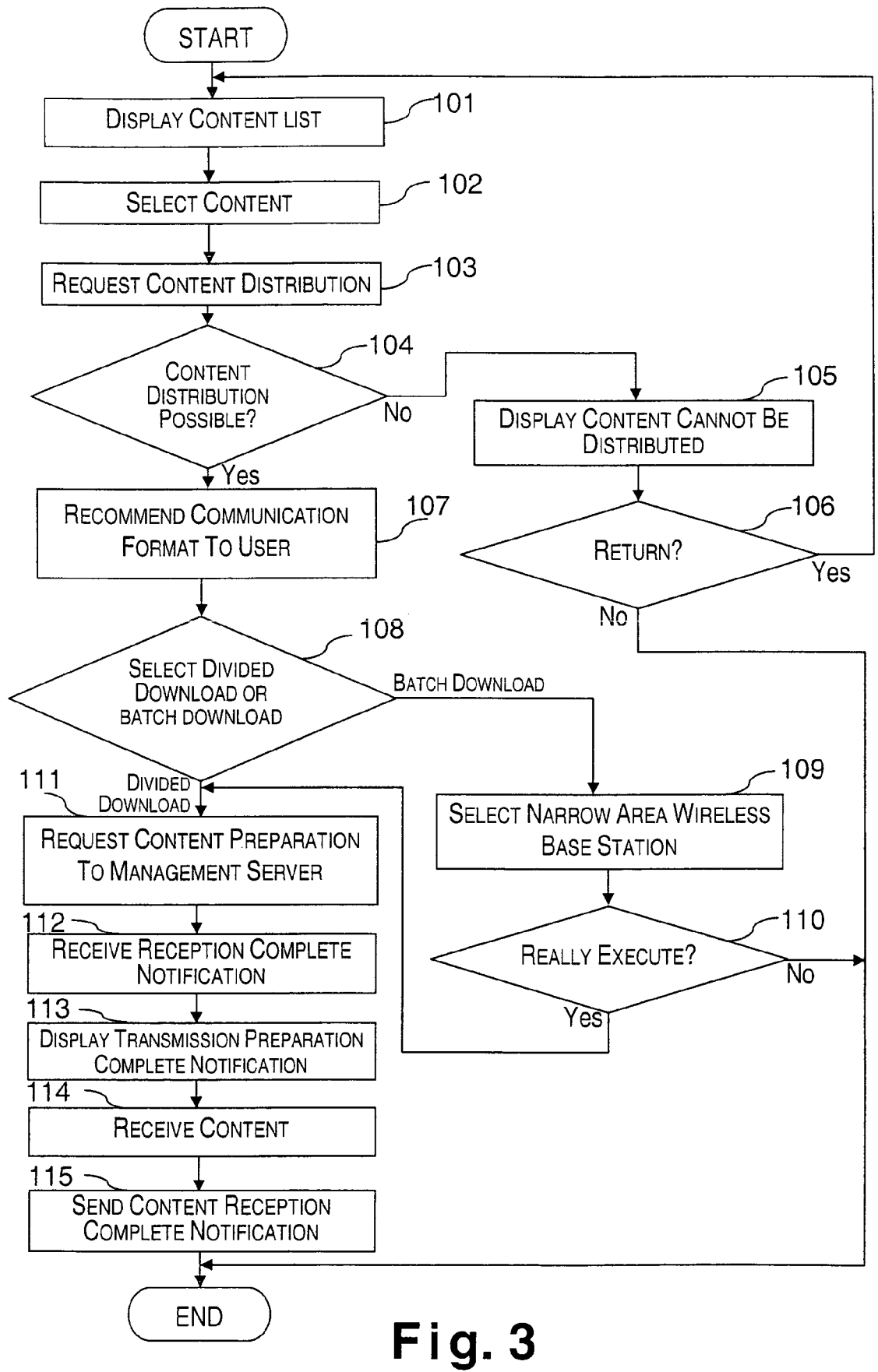
FIG. 3 is a flowchart describing a content reception processing executed in a vehicle-mounted terminal device of the mobile body information system in accordance with the first embodiment of the present invention.

FIG. 3 is a flow chart describing the operation processing for receiving the information executed in the vehicle-mounted terminal device 1.

Prior to the operation processing shown in FIG. 3, the user operates the operation section 16 and selects the mobile body communication function of the vehicle-mounted terminal device 1. The reception level measurement section 13 of the mobile body communication unit 10 is configured and arrange to measure the communication sensitivity, i.e., the level of the signal reception, between one of the narrow area wireless base stations 33a-33f that corresponds to the communication area in which the vehicle is currently traveling or staying. The reception level measurement section 13 is further configured and arranged to verify whether or not the sensitivity level is greater than the predetermined value. When the sensitivity level is greater than the predetermined value, the control unit 11 of the vehicle-mounted terminal device 1 is configured and arranged to display in the display section 17 that the sensitivity level is sufficient to receive the information through the one of the narrow area wireless base stations 33a-33f. The following description of the operation processing will be on the assumption that the sensitivity level was greater than the predetermined value at this initial step.

Moreover, it is presupposed that the user has entered the destination or through-point locations into the travel route calculation section 23 of the navigation system unit 20 by operating the operation section 16 prior to this operation processing. Thus, the calculation of the planned travel route and the operator verification of the planned travel route have been completed by this time. The information such as the destination, through-point locations, and planned traveling route is stored in the travel route memory section 24 of the vehicle-mounted terminal device 1.

Furthermore, the current position acquiring section 22 is configured and arranged to verify a current position of the vehicle with respect to roadmap data. The roadmap data is read in from the roadmap data section 21. The markings for the current position of the vehicle on the route map and travel direction are updated regularly at predetermined intervals. The actual travel route is stored in the travel route memory section 24.

Upon actuation of the mobile body communication unit 10, the base station data section 25 is configured and arranged to be put into operation. The base station data section 25 is configured and arranged to output base station information or installation data of the narrow area wireless base stations 33a-33f such as, but not limited to, a position of the closest one of the narrow area wireless base stations 33a-33f and its communication area (including signal strength), and positions of the narrow area wireless base stations 33a-33f on the planned travel route and their communication areas in conjunction with the roadmap data. Moreover, the base station data section 25 is configured and arranged to consecutively update the base station information.

In step 101 of FIG. 3, the control unit 11 of the vehicle-mounted terminal device 1 is configured and arranged to display a content information list on the display section 17. More specifically, when the user operates the operation section 16 to activate the functions of the mobile body information system of the vehicle-mounted terminal device 1, the communication functions of the mobile body communication unit 10 are started. Then the control unit 11 is configured to verify a state that allows communication between the closest narrow area wireless base station 33a based on the determination result of the reception level measurement section 13. Then the vehicle-mounted terminal device is configured and arranged to request a mobile address to be assigned and a content list to be sent to the vehicle-mounted terminal device 1 from the management server 3 of the center system 2.

The management server 3 is configured and arranged to assign the mobile address MR1 to the vehicle-mounted terminal device 1 and transmit a prepared list of contents divided into a plurality of packets to the vehicle-mounted terminal device 1 via the narrow area wireless base station 33a. The mobile body communication unit 10 is configured and arranged to receive the list of contents and then display content list information in the display section 17.

In step 102, the user selects content that the user wishes to download from the list of contents displayed in the display section 17 using the cursor movement pushbutton switch and the decision button of the operation section 16. The user can also select multiple contents if the user wishes.

In step 103, the vehicle-mounted terminal device 1 is configured and arranged to issue a distribution request for the content selected by the user as the user selects the decision button of the operation section 16 to inquire whether the content can be distributed or not.

The distribution request for the content is sent to the management server 3. The management server 3 is configured and arranged to send an inquiry to the content server 4 as to whether the requested content can be distributed. The result of this inquiry is then transmitted in reply to the request by the vehicle-mounted terminal device 1. Moreover, information such as a title of the requested content, volume of the file and an amount billed for the requested content is transmitted with the result of this inquiry.

Based on the result of the inquiry sent from the management server 3, the vehicle-mounted terminal device 1 is configured and arranged to check whether or not content distribution from the management server 3 is possible in step 104. When the requested content cannot be distributed, the process proceeds to step 105. When the content can be distributed, the process proceeds to step 107.

In step 105, the vehicle-mounted terminal device 1 is configured and arranged to display in the display section 17 that the content requested for distribution cannot be distributed.

In step 106, the user uses the operation unit 16 to choose either selecting content once again or ending the process. When the user chooses to select content again, the process returns to step 101. If the user chooses to end the process in 106, the operation processing ends.

When it is determined that the content can be distributed in step 104, the vehicle-mounted terminal device 1 is configured and arranged to select a communication format for receiving the content through the narrow area wireless base stations 33a-33f and recommend the selected communication format to the user in step 107.

More specifically, in step 107, the communication format determination section 12 of the vehicle-mounted terminal device 1 is configured and arranged to obtain the planned travel route stored in the travel route memory section 24. Then, the communication format determination section 12 is further configured and arranged to read out the positions of the narrow area wireless base stations 33a-33f that are located in the vicinity of the planned travel route in conjunction with the roadmap data and the information on the communication areas of the narrow area wireless base stations 33a-33f from the base station data section 25.

Based on the base station data of the currently communicating narrow area wireless base station 33a and other narrow area wireless base stations 33b-33f that are located in the planned travel route, the communication format determination section 12 is configured and arranged to determine whether or not there will be sufficient intermittent communication time to download the content with respect to the volume of files of the content while the vehicle travels on the planned travel route. In other words, the communication format determination section 12 is configured and arranged to determine whether the installation density of the wireless base stations 33a-33f in the planned travel route is large enough such that the content can be intermittently distributed to the vehicle-mounted terminal device 1 from the wireless base stations 33a-33f while the vehicle travels through the communication areas corresponding to the wireless base stations 33a-33f. Then, the communication format determination section 12 is configured and arranged to output a determination result to the control unit 11. The control unit 11 is configured and arranged to display the recommended communication format in the display section 17 based on the determination result from the communication format determination section 12. More specifically, when the communication format determination section 12 determines that the installation density of the wireless base stations is large enough, the control unit 11 is configured and arranged to display a divided download format as the recommended communication format. When the communication format determination section 12 determines that the installation density of the wireless base station is not large enough, the control unit 11 is configured and arranged to display a batch download format as the recommended communication format. More specifically, whether the installation density of the wireless base stations (i.e., the density of the communication areas along a planned travel route of the vehicle) is high or low is determined based on a several factors including, but not limited to, the number of narrow area wireless base stations 33a-33f, the distance (time) to the destination when the vehicle travels on the planned travel route, and the size of the requested content (time required to download the requested content). When the installation density (density of the communication areas) is determined to be sufficient for downloading the requested content in a divided download format based on these factors, the communication format determination section 12 is configured to determine the installation density (density of the communication areas) is high. When the installation density (density of the communication areas) is determined to be insufficient to download the requested content in a divided download format based on these factors, the communication format determination section 12 is configured to determine the installation density (density of the communication areas) is low.

Figure 4:
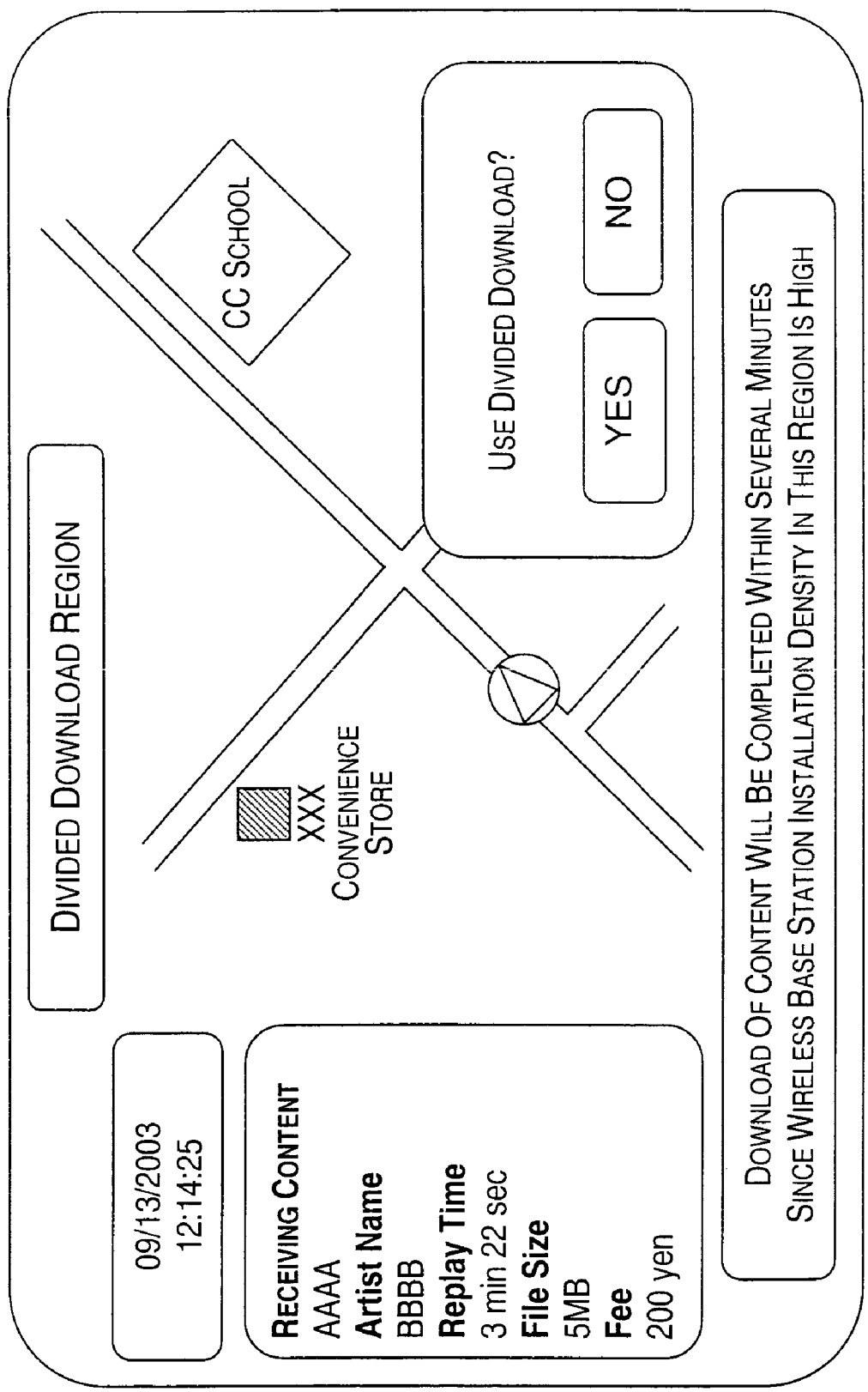
FIG. 4 is a diagrammatic view of a screen display on a display section of the vehicle-mounted terminal device recommending a divided download format in accordance with the first embodiment of the present invention.

FIG. 4 is a diagrammatic view of an example of the communication format selection screen displayed by the display section 17 when the "divided download" format is recommended in step 107 of FIG. 3. In the divided download format, the distribution of the content is divided such that the content is distributed to the vehicle-mounted terminal device 1 from a plurality of the narrow area wireless base stations 33a-33f. The display screen is preferably organized as a communication format selection screen with a map in the background that includes a current position of the vehicle and a location of a narrow area wireless base station, e.g., a convenience store, closest to the current position of the vehicle as seen in FIG. 4. Of course, it will be apparent to those skilled in the art from this disclosure that the map in the background can be arranged such that a plurality of the narrow area wireless base stations in the vicinity of the current position of the vehicle or the planned travel route are displayed.

Figure 5:
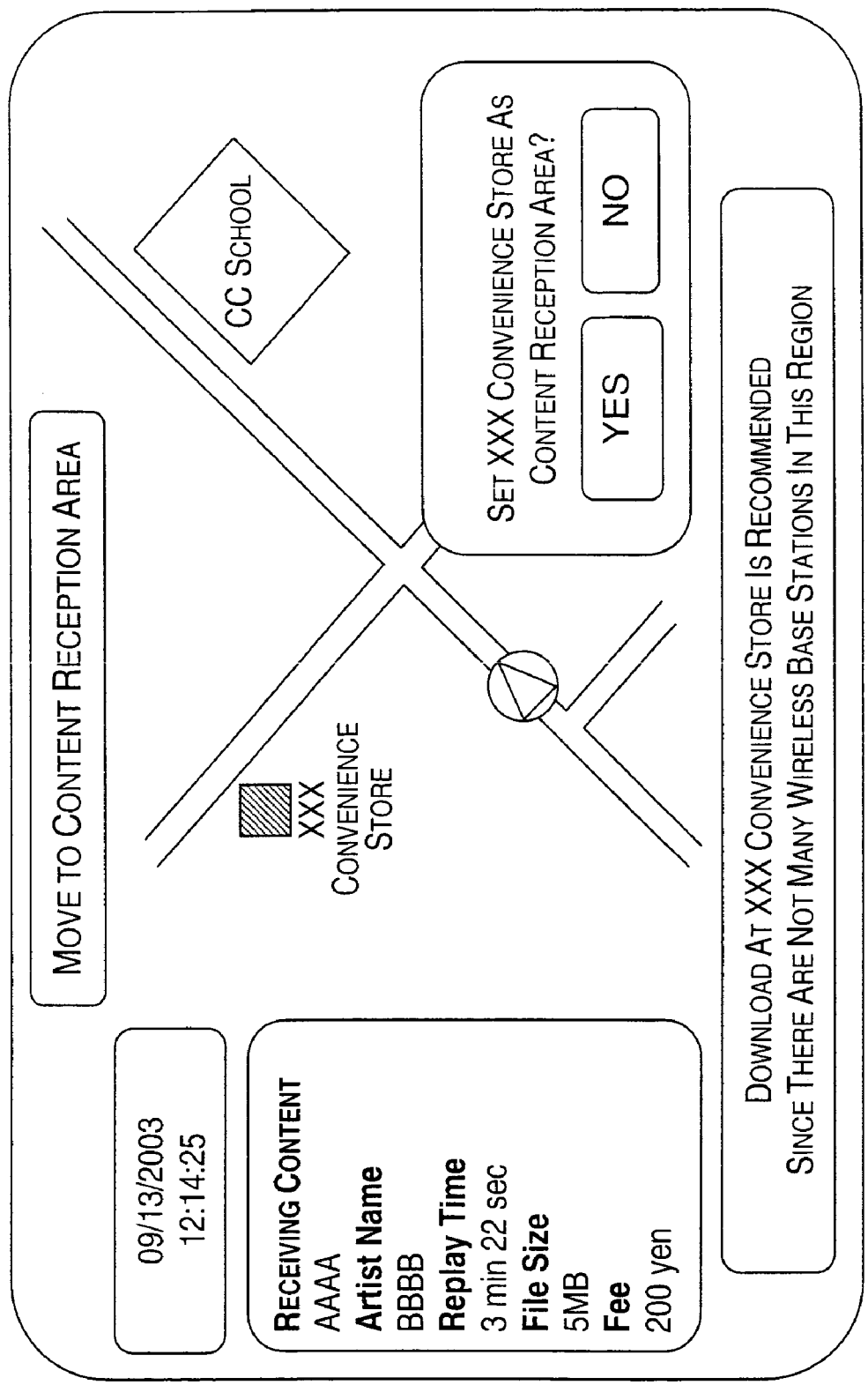
FIG. 5 is a diagrammatic view of a screen display on the display section of the vehicle-mounted terminal device recommending a batch download format in accordance with the first embodiment of the present invention.

FIG. 5 is a diagrammatic view of an example of the communication format selection screen displayed in the display section 17 when the "batch download" format is recommended in step 107 of FIG. 3. In the batch download format, the distribution of the content is held within a communication area of the closest narrow area wireless base station 33a and the requested content is transmitted in batches to the vehicle-mounted terminal device 1.

In step 108, the user selects either the batch download format or the divided download format following the screen display of the recommended communication format. For example, when the divided download format is recommended by the vehicle-mounted terminal device 1 and the communication format selection screen shown in FIG. 4 is displayed on the display section 17, the user can either select the divided download format by selecting "Yes" or select the batch download format by selecting "No" to the inquiry "Use Divided Download?". When the batch download format is recommended by the vehicle-mounted terminal device 1 and the communication format selection screen shown in FIG. 5 is displayed on the display section 17, the user can either select the batch download format by selecting "Yes" or select the divided download format by selecting "No" to the inquiry "Use Batch Download?".

When the divided download format is selected in step 108, the process proceeds to step 111. When the batch download format is selected in step 108, the process proceeds to step 109.

In step 109, the user selects one of the narrow area wireless base stations 33a-33f that is in the vicinity of the current position of the vehicle or that is along the planned travel route of the vehicle to be used to download the requested content.

More specifically, in step 109, a roadmap that includes the communication area of the closest narrow area wireless base station 33a and the current position of the vehicle are initially displayed in the display section 17. When the user decides that another one of the narrow area wireless base stations 33b-33f would be better, the user operates the operation section 16 to display the positions of the narrow area wireless base stations 33a-33f in a wider region including the current position along the planned travel route in the display section 17. The user then uses the cursor displayed in the display section 17 to select one of the narrow area wireless base stations 33a-33f that is more suitable for the user among the narrow area wireless base stations 33a-33f displayed in the display section 17.

In step 110, the user verifies either to execute the batch download through the one of the narrow area wireless base stations 33a-33f selected in step 109 or to cancel the distribution request because the user determines these are no suitable narrow area wireless base station along the planned travel route.

When it is selected to execute the batch download in step 110, the process proceeds to step 111. When the distribution request is cancelled in step 110, the operation process ends.

In step 111, the vehicle-mounted terminal device 1 is configured to request the management server 3 to prepare the content requested for distribution according to one of the divided download format and the batched download format determined in step 108 or 110.

In step 112, the vehicle-mounted terminal device 1 is configured and arranged to display a content request reception notification from the management server 3 on the display section 17 The content request reception notification indicates the management server 3 has sent instructions to the content server 4 to forward the requested content to the cache server 6.

In step 113, the vehicle-mounted terminal device 1 is configured and arranged to display a transmission preparation complete notification from the management server 3 on the display section 17. The transmission preparation complete notification indicates the transmission of the content from the content server 4 to the cache server 6 is complete.

In response to the transmission preparation complete notification, the control unit 11 of the vehicle-mounted terminal device 1 is configured to transmit a transmission start request to the management server 3 via the narrow area wireless base station 33a.

In step 114, the vehicle-mounted terminal device 1 is configured and arranged to receive the content from the cache server 6 via one or more of the narrow area wireless base stations 33a-33f depending on the communication format selected by the user in the prior steps. The cache server 6 is configured to be address controlled by the management server 3 regarding the addresses appended on the packets of the requested content.

When the user has selected the batch download format, the vehicle remains within a communication area of one of the narrow area wireless base stations 33a-33f, for example, a XXX convenience store, that is selected in step 109. More specifically, the user downloads the content via the one of the narrow area wireless base stations 33a-33f while the vehicle equipped with the vehicle mounted terminal device 1 is parked at the XXX convenience store or is roaming within the communication area of the narrow area wireless base station at the XXX convenience store.

When the user has been selected the divided download format, the vehicle travels on the planned travel route while the vehicle-mounted terminal device 1 starts receiving the content through the narrow area wireless base station 33a with which the vehicle-mounted terminal device 1 is currently communicating within the communication area of the narrow area wireless base station 33a. The communication or reception of the requested content is interrupted when the vehicle leaves the communication area of the narrow area wireless base station 33a or reception of the signal falls below the predetermined value. The vehicle-mounted terminal device 1 and the center system 2 are put in a standby state until the communication between the vehicle-mounted terminal device 1 and one of the narrow area wireless base stations 33a-33f starts again. When the vehicle enters into a communication area of the next narrow area wireless base station 33b, communication will start again and distribution of the content is resumed. The reception of the content is resumed from a portion of the packet that continues from the last portion of the packet received in the previous communication between the vehicle-mounted terminal device 1 and the narrow area wireless base station 33a.

In step 115, the vehicle-mounted terminal device 1 is configured and arranged to send a content reception complete notification to the management server 3 via one of the narrow area wireless base stations 33a-33f.

The operation processing for receiving the information executed in the vehicle-mounted terminal device 1 can be stored in a computer-readable medium having computer-executable components comprising instructions for performing the operation process in FIG. 3. Examples of computer-readable medium having computer-executable components comprising instructions for performing the steps of FIG. 3 include, but not limited to, hard drives, memory devices, USB flash drives, DVDs, a CD ROM or other optical media. Thus, the control unit 11 of the vehicle-mounted device 1 is configured and arranged to read the program stored on a portable computer-readable medium, and store the program from the portable computer-readable medium into a fixed computer-readable medium contained within the vehicle-mounted device. Thus, the phrase "computer-readable medium" as used herein refers to any storage medium (portable or fixed) that can contain computer-executable components comprising instructions for performing the steps of FIG. 3. In other words, the function of receiving the information described in FIG. 3 can be added to an existing vehicle by using or installing the computer-readable medium storing the operation processing of FIG. 3 to the vehicle-mobile terminal device 1 or the like along with other necessary devices.

Figure 6:
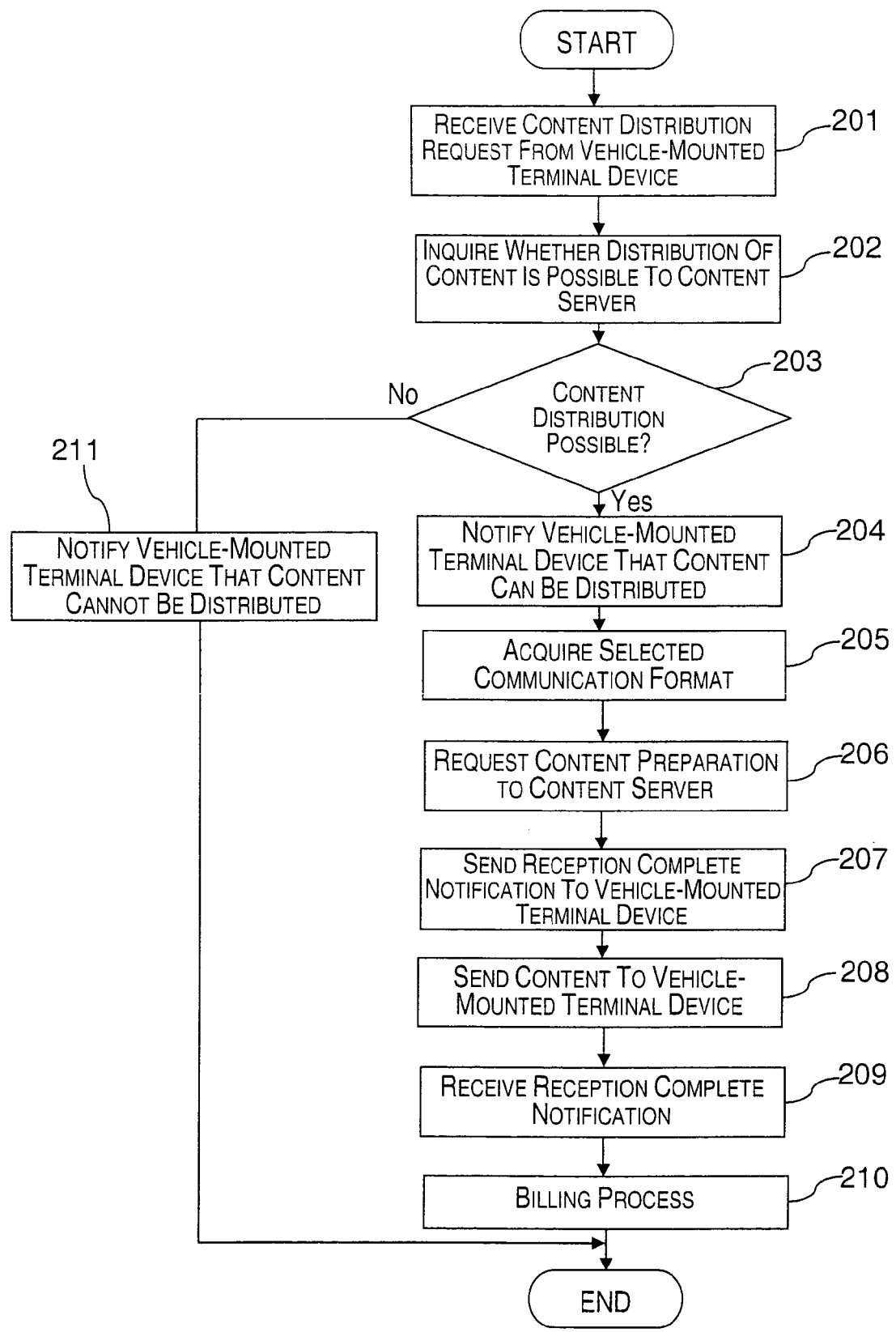
FIG. 6 is a flow chart describing a content distribution processing executed in a management server of a center system of the mobile body information system in accordance with the first embodiment of the present invention.

Referring now to FIG. 6, an operation process of the center system 2 for distributing the contents will be described. Prior to the operation processing shown in FIG. 6 starts, the vehicle-mounted terminal device 1 is configured and arranged to display the content information list that has been already transmitted from the management server 3 to the vehicle-mounted terminal device 1 in the display section 17.

In step 201, the management server 3 is configured and arranged to receive the distribution request for the content selected by the user from the vehicle-mounted terminal device 1 via one of the narrow area wireless base stations 33a-33f that is currently communicating with the vehicle-mounted terminal device 1.

In step 202, the management server 3 is configured and arranged to send an inquiry to the content server 4 as to whether the content requested for distribution can be distributed.

In step 203, the management server 3 is configured and arranged to check the reply from the content server 4 as to whether or not the content server 4 can distribute the requested content. When distribution of the requested content is possible, the process proceeds to step 204. When distribution of the requested content is not possible, the process proceeds to step 211.

In step 211, the management server 3 is configured and arranged to transmit to the vehicle-mounted terminal device 1 that the content requested for distribution cannot be utilized and end the processing.

In step 204, the management server 3 is configured and arranged to inform the vehicle-mounted terminal device 1 that the content requested by the vehicle-mounted terminal device 1 can be distributed via the narrow area wireless base station 33a.

In step 205, the management server 3 is configured and arranged to acquire information from the vehicle-mounted terminal device 1 regarding the communication format selected by the user for downloading the content.

When the batch download format is selected by the user, the user selects one of the narrow area wireless base stations 33a-33f through which the user wishes to download the contents. Thus, the management server 3 is configured and arranged to acquire an address of the selected one of the narrow area wireless base stations 33a-33f, for example, the narrow area wireless base station 33b, and set the address of the narrow area wireless base station 33b as the communication path.

When the divided download format is selected by the user, the management server 3 is configured and arranged to acquire an address of the narrow area wireless base station 33a that is currently communicating with the vehicle-mounted terminal device 1, and set the address of the narrow area wireless base station 33a as an initial communication path.

In step 206, the management server 3 is configured and arranged to instruct the content server 4 to prepare the content that is requested by the user for distribution. In other words, the management server 3 is configured and arranged to instruct the content server 4 to send the requested content to the cache server 6 to store it in the cache server 6. Moreover, the management server 3 is configured and arranged to instruct the content server 4 and the cache server 6 to set the distribution destination of the requested content to the fixed address MR of the vehicle-mounted terminal device 1 in this step.

In step 207, the management server 3 is configured and arranged to send the content request reception notification to the vehicle-mounted terminal device 1 through the narrow area wireless base station 33a that is currently communicating with the vehicle-mounted terminal device 1. The content request reception notification notifies that the request for the content has been received. Then, the management server 3 is configured and arranged to receive a storage complete notification or a distribution preparation complete notification from the cache server 6 that notifies that the distribution preparations for distributing the requested content is complete. Then, the management server 3 is configured and arranged to send the transmission preparation complete notification to the vehicle-mounted terminal device 1 that indicates the transmission preparation for distributing the content is complete.

In step 208, the cache server 6 is configured and arranged to transmit the content to the vehicle-mounted terminal device 1 according to the communication format acquired in step 205. The transmission of the content from the cache server 6 to the vehicle-mounted terminal device 1 is address controlled by the management server 3 such that the mobile address of the vehicle-mounted terminal device 1 is set as the destination for the transmission of the packets of the content.

In step 209, the management server 3 and the cache server 6 are configured and arranged to receive a content reception complete notification from the vehicle-mounted terminal device 1 via one of the narrow area wireless base stations 33a-33f upon completion of the downloading of the requested contents.

Moreover, the management server 3 is configured and arranged to receive a content transmission complete notification from the cache server 6 when the cache server 6 completely transmits the requested content. The management server 3 is configured and arranged to verify that both the content reception complete notification from the vehicle-mounted terminal device 1 and the content transmission complete notification from the cache server 6 have arrived to the management server 3. Then, the management server 3 is configured and arranged to instruct the cache server 6 to delete the content on the cache server 6 that has been transmitted to the vehicle-mounted terminal device 1.

Moreover, when the transmission remains interrupted after a prescribed time has elapsed since the transmission started and when the cache server 6 has not received the content reception complete notification from the vehicle-mounted terminal device 1, the cache server 6 is configured and arranged to compulsorily stop the transmission of the content to the vehicle-mounted terminal device 1. The cache server 6 is configured and arranged to take into consideration the amount or the size of the content to be distributed and a safety margin for the time to transmit the content when it compulsorily stops the transmission. Then the cache server 6 is configured and arranged to notify the management server 3 that the transmission is stopped. Accordingly, the transmission load of the cache server 6 due to the cache server 6 being kept in a transmission interrupt state for a long period of time can be reduced.

In step 210, the management server 3 is configured and arranged to execute a billing processing for the distribution of the content. In the billing process, the management server 3 is configured and arranged to input billing data such as date, content items and fees to be charged as a monthly bill to a payment account of the user who requested the content for distribution. Upon completion of the billing processing, the management server 3 is configured and arranged to end the operation processing.

In the first embodiment of the present invention, the vehicle-mounted terminal device 1 constitutes a mobile terminal, and the narrow area wireless base stations 33a-33b constitutes a wireless base station. Moreover, the management server 3, content server 4 and the cache server 6 constitute a host. Also, the steps 107, 108 and 109 shown in FIG. 3 form a communication format determination section of the vehicle-mounted terminal device 1.

As described above, the mobile body information system in accordance with the first embodiment of the present invention comprises the communication format determination section 12 that is configured to determine a system to download content based on the installation density of the narrow area wireless base stations 33a-33f along the planned travel route. The communication format determination section 12 is also configured and arranged to select a communication format corresponding to this download format. More specifically, the communication format determination section 12 is configured to select a divided download format for receiving the content when the narrow area wireless base stations 33a-33f are installed in high density. When the divided download format is selected by the user, the vehicle-mounted terminal device 1 intermittently receives distribution of content while the vehicle is traveling. The communication format determination section 12 is configured to select a batch download format when the installation density of the narrow area wireless base stations 33a-33f is low. When the batch download format is selected by the user, the vehicle-mounted terminal device 1 receives the content in a communication area of one of the narrow area wireless base stations 33a-33f.

Accordingly, with the mobile body information distribution device 1 in accordance with the first embodiment of the present invention, the requested content can be distributed to the vehicle-mounted terminal device 1 in a divided manner while the vehicle travels through a plurality of communication areas, especially when the content downloaded is a content, e.g., image data, with a relatively large size, and thus, requires longer download time. Therefore, in the present invention, the transmission of the content is not ended when the vehicle exits from a communication area of one of the narrow area wireless base stations 33a-33f before the download of the content is completed as with the conventional mobile body information system.

Furthermore, the conventional problem of remaining within one communication area of a specific one of the narrow area wireless base stations 33a-33f in order to receive the content regardless of the installation density of the narrow area wireless base stations 33a-33f can be eliminated. For example, with the mobile body information system in accordance with the first embodiment of the present invention, it is not necessary to stop at the specific one of the narrow area wireless base stations 33a-33f is installed, e.g., a convenience store, when the installation density of the narrow area wireless base stations 33a-33f is high. Thus, a communication format in which the requested content can be reliably distributed to the vehicle-mounted terminal device 1 is presented to the user.

Moreover, in the mobile body information system in accordance with the first embodiment of the present invention comprises the base station data section 25 that outputs base station data regarding one of the narrow area wireless base stations 33a-33f that is currently communicating with the vehicle-mounted terminal device 1 and the other narrow area wireless base stations 33a-33f that are in the vicinity of the planned travel route. The base station data is obtained based on a roadmap data stored in the roadmap data section 21 and the current position of the vehicle output from the current position acquiring section 22. Then, the installation density of the narrow area wireless base stations 33a-33f is evaluated based on the base station data and the communication format for receiving the content is determined. Accordingly, with the mobile body information system in accordance with the first embodiment of the present invention, the user can be provided with reliable determination materials such that the user can select among the options of the communication format.

In the mobile body information system in accordance with the first embodiment of the present invention, the local contents such as local direction information of specific regions, and the shared contents such as weather reports and news are stored in the content server 4. However, it will be apparent to those skilled in the art from this disclosure that the center system 2 can include a plurality of cache servers that are connected to the Internet 5, then each of the cache servers is arranged to have a prescribed region under its territory. In such a case, each of the cache servers is configured and arranged to store the shared information contents such as news and weather reports in advance, as well as local contents that correspond to each of the narrow area wireless base stations 33a-33f that are installed within the prescribed territory of the cache server. The shared information contents and the local contents are preferably updated periodically or regularly as appropriate.

Moreover, in such a case, contents stored in the content server 4 are preferably limited to the paid contents, e.g., music or images. Those paid contents are sent to appropriate one of the cache servers as per the instruction of the management server 3 for distribution to vehicle-mounted terminal device 1. Accordingly, the content transmission control load from the management server 3 and the content server 4 to one of the cache servers can be reduced.

Next, an alternative control operation of hand over control for the divided download format in the first embodiment will be described.

In the divided download format of the mobile body information system in accordance with the first embodiment of the present invention, the vehicle-mounted terminal device 1 is configured and arranged to request a mobile address to resume the transmission of the content when the vehicle exits from the communication area of the narrow area wireless base station 33a and enters into the communication area of the next narrow area wireless base station 33b. Alternatively, the management server 3 can be configured and arranged to establish a plurality of addresses of the narrow area wireless base stations 33a-33f that are in the vicinity of the planned travel route, and a plurality of corresponding mobile addresses MR1, MR2 . . . of the vehicle-mounted terminal device 1 in advance, in step 205 of FIG. 6, when the divided download format is selected. More specifically, the management server 3 can be configured and arranged to set up communication format data including the plurality of addresses of the narrow area wireless base stations 33a-33f that are in the vicinity of the planned travel route, and the plurality of corresponding mobile addresses MR1, 2 . . . based on the current position of the vehicle and the planed travel route upon the management server 3 is notified that the user selected the divided download format.

In this alternative operation processing, the management server 3 is configured and arranged to assign each of the mobile addresses MR1, MR2 . . . to the vehicle-mounted terminal device 1 for each of the narrow area wireless base stations 33a-33f that is expected to be used as a communication path as the vehicle travels on the planned travel route in advance. Then the management server 3 is configured and arranged to send the mobile addresses MR1, MR2 . . . to the cache server 6 in advance. When the vehicle enters in a corresponding communication area of the each of the narrow area wireless base stations 33a-33f and requests transmission start, the cache server 6 is configured and arranged to start the transmission of the packets of the content on which that mobile addresses MR1, MR2 . . . and fixed address MR are appended through the second routers 8a and 8b. For example, if the mobile address M1 and M2 are assigned for the corresponding narrow area wireless base stations 33a and 33b, the second router 8a is configured and arranged to copy the packets which have the mobile addresses MR1 and MR2 and then send the packets to both the narrow area wireless base stations 33a and 33b.

In this alternative operation processing, the vehicle-mounted terminal device 1 is configured and arranged to receive the packets directed to a fixed address MR using the narrow area wireless base station 33a until the vehicle leaves the communication area of the narrow area wireless base station 33a, then store the sequence number of the packet that is last received. When the vehicle continues travelling to enter into the communication area of the narrow area wireless base station 33b and establish communication with the narrow area wireless base station 33b, the vehicle-mounted terminal device 1 is configured and arranged to receive the packets directed to the fixed address MR starting from a packet with a continuous sequence number of the packet from the narrow area wireless base station 33b.

According to this alternative operation process, when the divided download format is used, the management server 3 does not have to append a mobile address to the vehicle-mounted terminal device 1 each time the vehicle enters into a communication area of one of the narrow area wireless base stations 33a-33f and send the mobile address to the cache server 6. Accordingly, the cache server 6 is configured and arranged to be independently communicate with the vehicle-mounted terminal device 1 and control the distribution of the content. As a result, the communication control load of the management server 3 can be reduced.

Moreover, the plurality of mobile addresses can be assigned for the plurality of the narrow area wireless base stations 33a-33f that are in the vicinity of the current position of the vehicle instead of the plurality of the narrow area wireless base stations 33a-33f that are in the planned travel route. In that case, even if the vehicle strays from the planned travel route, the content can still be distributed using the divided download format without any problems.

Second Embodiment

A Referring now to FIG. 7, a mobile body information system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a prime (').

Figure 7:
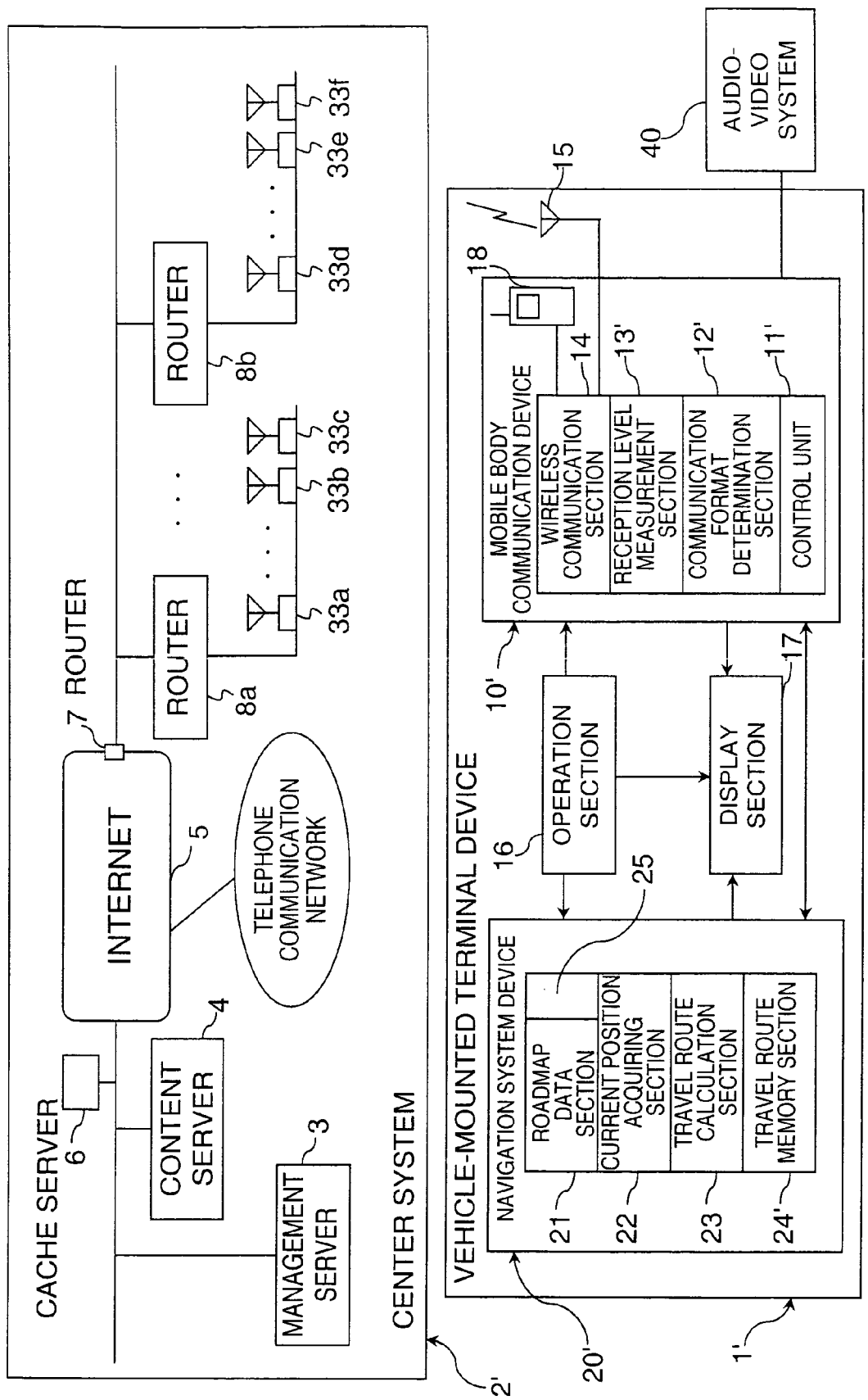
FIG. 7 is a block diagram illustrating system configuration of a mobile body information system in accordance with a second embodiment of the present invention.

FIG. 7 is a block diagram illustrating a system configuration of the mobile body information system in accordance with the second embodiment of the present invention. The mobile body information system of the second embodiment comprises a vehicle-mounted terminal device 1' including a communication device 18 and a center system 2' including a telephone communication network. Moreover, in the second embodiment, the vehicle-mounted terminal device 1' is configured and arranged to determine the recommended communication format based on previously measured reception sensitivities of the narrow area wireless base stations 33a-33f in the vicinity of the current position of the vehicle. Thus, even when the base station data section 25 does not have any installation data of the narrow area wireless base stations 33a-33f in the planned travel route, the recommended format can be determined based on the previously obtained reception sensitivity historical data.

The vehicle-mounted terminal device 1' of the second embodiment basically comprises a mobile body communication unit 10', a navigation system 20', the operation section 16, the display section 17, and the antenna 15. The mobile body communication unit 10' is configured to perform a mobile body communication function of the vehicle-mounted terminal device 1'. The navigation system unit 20' is configured to assist the mobile body communication function of the mobile body communication unit 10'. The operation section 16 and display section 17 are the man-machine interface for the navigation system 20'. The antenna 15 is coupled to the mobile body communication unit 10'.

The mobile body communication unit 10' of the vehicle-mounted terminal device 1 comprises a control unit 11', a communication format determination section 12', a reception revel measurement section 13', a wireless communication section 14, and the communication device 18. The communication device 18 is preferably a portable telephone that is configured and arranged to have a wider communication range than the communication range of the wireless communication section 14. The control unit 11 is configured and arranged to control the entire vehicle-mounted terminal device 1'. The communication format determination section 12' is configured and arranged to determine the communication format between the narrow area wireless base stations 33a-33f and the vehicle-mounted terminal device 1'. The reception level measurement section 13' is configured and arranged to measure and store in the reception 2a' sensitivity between the narrow area wireless base stations 33a-33f and the vehicle-mounted terminal device 1'.

The navigation system 20' of the vehicle-mounted terminal device 1' basically comprises the roadmap data section 21, the current position acquiring section 22, the travel route calculation section 23, a travel route memory section 24' and the base station data section 25. The travel route memory section 24' is configured and arranged to store the travel route determined by the user based on the travel route calculated by the travel route calculation section 23 and the actual travel route. Moreover, the travel route memory section 24' is further configured and arranged to store the reception sensitivity measurement result between the vehicle-mounted terminal device 1' and the narrow area wireless base stations 33a-33f on the actual travel route.

One of the main differences between the vehicle-mounted terminal device 1' of the second embodiment and the vehicle-mounted terminal device 1 of the first embodiment is the configuration of the communication format determination section 12' of the mobile body communication unit 10'. The structure and configuration of the display section 17 and operation section 16 are the same as the first embodiment. The structure and configuration of the center system 2' are also the same as the first embodiment except for that the telephone communication network is connected to the Internet 5.

In the first embodiment of the present invention, the communication format determination section 12 is configured to use data of the base station data section 25 to determine either the divided download format or the batch download format from the installation density of the narrow area wireless base stations 33a-33f that are close to the current position or on the planned travel route. On the other hand, in the second embodiment of the present invention, the communication format determination section 12' is configured and arranged to determine the communication format based on reception sensitivity historical data of the narrow area wireless base stations 33a-33f. The reception sensitivity historical data are data of the reception sensitivity of the radio waves from the wireless base stations 33a-33f that are previously measured by the reception level measurement section 13' and stored in the travel route memory section 24'.

As in the first embodiment, the reception level measurement section 13' is configured and arranged to detect the reception sensitivity. Based on the detection result from the reception level measurement section 13', the control unit 11' is configured and arranged to send control requests for communication start or communication stop to one of the narrow area wireless base stations 33a-33f from the wireless communication section 14 when the vehicle enters or exits the communication area. Moreover, in the second embodiment, the control unit 11' is further configured and arranged to output the reception sensitivity of each of the narrow area wireless base stations 33a-33f and store the reception sensitivities as the reception sensitivity historical data in the travel route memory section 24'.

When the vehicle-mounted terminal device 1' determines a recommended communication format for downloading the content, the communication format determination section 12' is configured and arranged to read out the reception sensitivity historical data of the narrow area wireless base stations 33a-33f on the travel route up to the current position of the vehicle from the travel route memory section 24'. Then the communication format determination section 12' is configured and arranged to determine the installation density of the narrow area wireless base stations 33a-33f in the vicinity of the current position of the vehicle based on the reception sensitivity historical data.

The communication control process for distributing content using the batch download format or the divided download format through the narrow area wireless base stations 33a-33f in the second embodiment is the same as the first embodiment.

Moreover, in the second embodiment of the present invention, when it is determined that the vehicle is not close to any of the narrow area wireless base stations 33a-33f or when the installation density of the narrow area wireless base stations 33a-33f is low, but when the user wishes to download the content while the vehicle is traveling, the user can operate the operation section 16 to switch to the communication through the communication device 18. More specifically, after the user operates the operation section 16 to switch to the communication through the communication device 18, the control unit 11' is configured and arranged to switch from communication through the wireless communication section 14 to communication through the communication device 18 in order to receive the distribution of content while the vehicle is traveling. As explained above, the communication device 18 is preferably a portable phone that has a wider communication range than the communication range of the wireless communication section 14.

When receiving distribution of the content by communicating through the communication device 18, the communication device 18 is connected to the Internet 5 through a plurality of portable telephone communication base stations indicated as telephone communication network shown in FIG. 7. Then the communication device 18 is connected to the management server 3 through the Internet 5.

The portable telephones (communication device 18) are conventional components that are well known in the art. Moreover, communication control methods among the portable telephones, the portable telephone communication base station, the telephone communication network and the Internet 5 are conventional methods that are well known in the art. Since the portable telephones and the communication control methods are well known in the art, these structures and configurations will not be discussed or illustrated in detail herein.

According to the second embodiment of the present invention, the reception level measurement section 13' of the vehicle-mounted terminal device 1' is configured and arranged to measure the radio wave reception sensitivity of each of the narrow area wireless base stations 33a-33f on the travel route while the vehicle is traveling and store the reception sensitivity historical data in the travel route memory section 24'. The communication format determination section 12' is configured and arranged to evaluate the installation density of the narrow area wireless base stations 33a-33f in the vicinity of the current position of the vehicle based on the reception sensitivity historical data stored in the travel route memory section 24'. Then the communication format determination section 12' is configured and arranged to select a communication format based on the installation density of the narrow area wireless base stations 33a-33f.

Accordingly, in the second embodiment of the present invention, even if the base station data section 25 does not have any installation data of the narrow area wireless base stations 33a-33f in the vicinity of the current position of the vehicle, it is still possible to determine and select a communication format based on the reception sensitivity history data. When the batch download format is selected, the vehicle-mounted terminal device 1' is configured to receive the content through one of the narrow area wireless base stations 33a-33f that is currently communication with the vehicle-mounted terminal device 1'. When the divided download format is selected, the vehicle-mounted terminal device 1' is configured to receive the content through the one of the narrow area wireless base stations 33a-33f that is currently communicating with the vehicle-mounted terminal device 1' and also from the narrow area wireless base stations 33a-33f that are connected to the vehicle-mounted terminal device 1' in succession on the travel route.

Moreover, in the second embodiment of the present invention, the communication can be selectively switched from the wireless communication section 14 to the communication device 18 that has a wider communication range. Accordingly, the requested content can be reliably received even when the installation density of the narrow area wireless base stations 33a-33f is low.

Furthermore, in the descriptions of the first and second embodiments, the base station data of the narrow area wireless base stations 33a-33f is related to the roadmap data and stored in the base station data section 25 of the navigation system units 20 or 20'. Of course, it will be apparent to those skilled in the art from this disclosure that the base station data of the narrow area wireless base stations 33a-33f can be arranged to be distributed as one of the contents that can be downloaded to the vehicle-mounted terminal devices 1 or 1' so that the base station data of the base stations 33a-33f are periodically updated. In such a case, the base station data of the narrow area wireless base stations 33a-33f can be updated to the most recent data and the user can effectively download the content though the narrow area wireless base stations 33a-33f.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-302160. The entire disclosure of Japanese Patent Application No. 2002-302160 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A mobile body information system for use in distributing information by a plurality of wireless base stations covering a plurality of communication areas, comprising:
a mobile terminal adapted to be mounted on a vehicle for receiving the information including a wireless communication section configured and arranged to communicate with at least one of the wireless base stations, and a communication format determination section configured and arranged to present a recommended communication format to a user of the mobile terminal based on a density of the communication areas of the wireless base stations along a travel route of the vehicle, the communication format determination section being further configured and arranged to select a divided download format when the density of the communication areas is determined to be high in which the information is distributed to the mobile terminal through at least two of the wireless base stations within corresponding communication areas of the at least two of the wireless base stations while the vehicle is traveling, and the communication format determination section being further configured and arranged to select a batch download format when the density of the communication areas is determined to be low in which the information is distributed to the mobile terminal through one of the wireless base stations within a corresponding communication area of the one of the wireless base stations.

2. The mobile body information system as recited in claim 1, wherein the communication format determination section is further configured and arranged to determine the density of the communication areas based on installation data of the wireless base stations and at least a current position of the vehicle.

3. The mobile body information system as recited in claim 1, wherein the communication format determination section is further configured and arranged to determine the density of the communication areas based on reception sensitivity historical data indicative of reception sensitivities of signals from the wireless base stations to the mobile terminal.

4. The mobile body information system as recited in claim 1, wherein the mobile terminal further includes a communication device having a wider communication range than a communication range of the wireless communication section, and the communication format determination section is further configured and arranged to also present a communication format utilizing the communication device when the density of the communication areas is determined to be low.

5. The mobile body information system as recited in claim 1, wherein the mobile terminal is configured and arranged to receive the information that are divided into a plurality of packets, and send a verification response to a wireless base station that is communicating with the mobile terminal upon a completion of a reception of each packet.

6. The mobile body information system as recited in claim 5, wherein the mobile terminal is configured and arranged to send a content reception complete notification when all of the packets of the information are received.

7. The mobile body information system as recited in claim 1, wherein the mobile terminal is configured and arranged to send a signal requesting that a temporary mobile address be assigned to the mobile terminal when the mobile terminal enters one of the communication areas of the wireless base stations.

8. The mobile body information system as recited in claim 1, further comprising a center system including a host that is configured and arranged to distribute the information to the mobile terminal through one of the wireless base stations when the batch download format is selected by the user, or through at least two of the wireless base stations when the divided download format is selected by the user.

9. The mobile body information system as recited in claim 8, wherein the host is configured and arranged to individually assign a temporary address to the mobile terminal upon a reception of a request from the mobile terminal issued when the vehicle enters one of the communication areas of the wireless base stations.

10. The mobile body information system as recited in claim 8, wherein the host is configured and arranged to assign a plurality of temporary addresses to the mobile terminal corresponding to the wireless base stations along the travel route of the vehicle upon a reception of a request from the mobile terminal issued when the vehicle enters one of the communication areas of the wireless base stations.

11. A computer-readable medium encoded with a computer program for distributing information by a plurality of wireless base stations covering a plurality of communication areas, comprising:

an instruction for receiving the information by a mobile terminal with a wireless communication section adapted to be installed on a vehicle having computer-executable components;

an instruction for determining a density of the communication areas covered by the corresponding wireless base stations along a travel route of the vehicle; and an instruction for presenting a batch download format as a recommended communication format for receiving the information when the density of the communication areas is low in which the information is distributed to the mobile terminal through one of the wireless base stations within a corresponding communication area of the one of the wireless base stations; and an instruction for presenting a divided download format as the recommended communication format for receiving the information when the density of the communication areas is high in which the information is distributed to the mobile terminal through at least two of the wireless base stations within corresponding communication areas of the at least two of the wireless base stations while the vehicle is traveling.

12. The computer-readable medium as recited in claim 11, wherein the determining of the density of the communication areas is based on installation data of the wireless base stations and at least a current position of the vehicle.

13. The computer-readable medium as recited in claim 11, wherein the determining of the density of the communication areas is based on reception sensitivity historical data indicative of reception sensitivities of signals from the wireless base stations to the mobile terminal.

14. The computer-readable medium as recited in claim 11, further comprising instructions for performing presenting also a communication format utilizing a communication device that has a wider communication range than a communication range of the wireless communication section of the mobile terminal when the density of the communication areas is low.

15. A method for distributing information to a mobile terminal adapted to be mounted on a vehicle having a wireless communication section through at least one of a plurality of wireless base stations, comprising:

determining a density of a plurality of communication areas corresponding to the wireless base stations along a travel route of the vehicle; and presenting a batch download format as a recommended communication format for receiving the information when the density of the communication areas is low and a divided download format as the recommended communication format for receiving the information when the density of the communication areas is high.

16. The method for distributing information as recited in claim 15, wherein the determining of the density of the communication areas is based on installation data of the wireless base stations and at least a current position of the vehicle.

17. The method for distributing information as recited in claim 15, wherein the determining of the density of the communication areas is based on reception sensitivity historical data indicative of reception sensitivities of signals from the wireless base stations to the mobile terminal.

18. The method for distributing information as recited in claim 15, further comprising presenting also a communication format utilizing a communication device with a wider communication range than a communication range of the wireless communication section of the mobile terminal when the density of the communication when the density of the communication areas is low.

19. The method for distributing information as recited in claim 15, further comprising distributing the information to the mobile terminal through one of the wireless base stations when the batch download format is selected, or through at least two of the wireless base stations when the divided download format is selected.

20. A mobile body information system use in distributing information by a plurality of wireless base stations covering a plurality of communication areas, comprising:

wireless communication means for communicating with at least one of the wireless base stations;

base station density determining means for determining a density of the communication areas of the wireless base stations along a travel route of the vehicle; and communication format determining means for presenting a batch download format as a recommended communication format for receiving the information when the density of the communication areas is low and a divided download format as the recommended communication format for receiving the information when the density of the communication areas is high.

* * * * *